United States Patent
Taleyarkhan

(10) Patent No.: US 10,233,843 B2
(45) Date of Patent: Mar. 19, 2019

(54) COMPOSITIONS AND METHODS FOR GENERATING CAVITATION RESISTANCE

(71) Applicant: Purdue Research Foundation, West Lafayette, IN (US)

(72) Inventor: Rusi Taleyarkhan, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 572 days.

(21) Appl. No.: 14/776,317

(22) PCT Filed: Mar. 12, 2014

(86) PCT No.: PCT/US2014/024480
§ 371 (c)(1),
(2) Date: Sep. 14, 2015

(87) PCT Pub. No.: WO2014/165121
PCT Pub. Date: Oct. 9, 2014

(65) Prior Publication Data
US 2016/0032839 A1    Feb. 4, 2016

Related U.S. Application Data

(60) Provisional application No. 61/777,414, filed on Mar. 12, 2013.

(51) Int. Cl.
| | |
|---|---|
| *G01N 13/02* | (2006.01) |
| *F02C 7/22* | (2006.01) |
| *B63H 1/18* | (2006.01) |
| *F15B 21/047* | (2019.01) |

(52) U.S. Cl.
CPC ............... *F02C 7/222* (2013.01); *B63H 1/18* (2013.01); *F15B 21/047* (2013.01); *F02M 2200/04* (2013.01)

(58) Field of Classification Search
CPC ........... G01N 12/02; F02C 7/222; B63H 1/18; F02M 2200/04; F15B 21/047
See application file for complete search history.

(56) References Cited

U.S. PATENT DOCUMENTS

| | | | | |
|---|---|---|---|---|
| 3,169,105 | A | * | 2/1965 | Preiser ................... F16C 33/22 |
| | | | | 204/196.28 |
| 4,953,389 | A | * | 9/1990 | Schurch ................. G01N 13/02 |
| | | | | 73/64.48 |
| 5,026,986 | A | | 6/1991 | Hurst |

(Continued)

*Primary Examiner* — Harshad R Patel
*Assistant Examiner* — Nigel Plumb
(74) *Attorney, Agent, or Firm* — Piroozi-IP, LLC

(57) ABSTRACT

A method for generating cavitation resistance in a liquid, a portion of which can be in contact with a surface is disclosed. The disclosed method can be carried out by pressure-treating the liquid, the liquid portion in contact with the surface, and/or the surface for a sufficient time to develop resistance to cavitation. The disclosed method can be carried out when the surface is made of a material having a surface roughness that is greater than the rc of the liquid. Suitable surfaces include borosilicate glass, drawn glass, copper, lead, steel, cast iron, metal alloys and concrete. The surfaces can be ship and boat propeller surfaces, the interior of fuel lines and fuel storage containers or any other surface where cavitation can occur.

16 Claims, 4 Drawing Sheets

(56) References Cited

U.S. PATENT DOCUMENTS

| | | | | |
|---|---|---|---|---|
| 5,394,740 A * | 3/1995 | Schramm | ............... | G01N 13/02 |
| | | | | 73/64.48 |
| 5,479,816 A * | 1/1996 | Richou | ................. | G01N 13/02 |
| | | | | 73/64.48 |
| 5,547,566 A * | 8/1996 | Sodi | ................... | G01N 33/1826 |
| | | | | 210/87 |
| 5,590,560 A * | 1/1997 | Joos | ...................... | G01N 11/00 |
| | | | | 356/73 |
| 5,833,501 A * | 11/1998 | Jones | .................... | B63H 11/08 |
| | | | | 440/1 |
| 6,085,577 A * | 7/2000 | Christensen | ........... | G01N 13/02 |
| | | | | 73/64.51 |
| 2003/0074010 A1 | 4/2003 | Taleyarkhan | | |
| 2005/0048852 A1* | 3/2005 | Fuse | ..................... | B63H 11/08 |
| | | | | 440/38 |
| 2006/0269033 A1 | 11/2006 | Taleyarkhan | | |
| 2007/0023245 A1* | 2/2007 | Lau | ................... | B60G 17/0152 |
| | | | | 188/267.2 |
| 2011/0174990 A1 | 7/2011 | Taleyarkhan | | |

\* cited by examiner

Void space

2r

Circular BB (~3mm OD) made of glass or stainless steel - affixed with RTV

High Pressure Chamber (Fluid-filled) - Precompression Of Entire Flow Loop Within Pump driven fluid loop; Alternately a Propeller without a loop Venturi (increased flow, Reduced pressure) region - Greatest likelihood of Cavitation onset

COMPOSITIONS AND METHODS FOR GENERATING CAVITATION RESISTANCE

This invention was made with government support under DE-FG07-07ID14890 awarded by the Department of Energy. The government has certain rights in the invention.

BACKGROUND OF INVENTION

Cavitation in liquids occurs when the liquid pressure is reduced sufficiently so that vapor bubbles of dissolved gas form. For example, cavitation readily occurs at the tips of rotating propeller blades when the pressure is sufficiently reduced. When cavitation bubbles implode a high-velocity liquid jet is created that can impinge on propellers and cause erosion. Cavitation can also occur in fuel lines feeding jet engines and limit jet engine performance. Cavitation is problematic in turbo-machinery, defense, propulsion, heat transfer, medicine, and a multitude of chemical process applications.

In general, a liquid can be placed into an amorphous metastable state by either superheating or super-tensioning and theoretically can then reach thermodynamic spinoidal limits (the stability limit before a liquid turns to gas) at which time it explosively changes state from liquid to vapor. Such amorphous states can be approached when heterogeneous nucleation sites such as air bubbles, motes or imperfect wetting at solid-liquid interfaces are eliminated or made inactive. This has typically required laborious efforts such as repeated degassing, heat treatment, filtration, use of surfactants and annealing and filtration to remove motes.

Table 1 provides a summary of certain physical properties of liquids including surface tension, vapor pressure, viscosity and an estimate for the critical radius ($r_c$), which is the radius which a cavity in a liquid must attain to permit it to grow into a visible sized bubble. $r_c$ is a threshold value for nucleation of a cavitation event. If a liquid cavity has a radius that is smaller than $r_c$, a much larger value of differential pressure, $\Delta p$, will be required to cause cavitation. The relationship between $r_c$ and $\Delta p$ is set out below.

$$r_c = 2\sigma/\Delta p,$$

where, $\Delta p$ is the pressure difference between the pressure of the gas within a cavity and the external pressure of the liquid field and $\sigma$ is the surface tension of the liquid. $r_c$ is also affected by liquid viscosity but that term normally creates a second order effect of much less significance and can effectively be ignored.

TABLE 1

Physical properties of various liquids

| Material | $\sigma$ (mN/m) | Vapor pressure, Pv (kPa) | $r_c$ (nm) (for $\Delta p$ = 10 bar) | Viscosity (cp) |
|---|---|---|---|---|
| Water | | | | |
| T = 300 K | 73 | 3.56 | ~140 | 0.87 |
| T = 358 K | 61 | 57.9 | | 0.31 |
| T = 458 K | 41 | 1130 | | |
| Acetone (300 K) | 23 | 33 | ~40 | 0.3 |
| Dodecane | 25 | 0.02 | ~40 | 1.3 |
| Ethanol | 23 | 8.7 | ~40 | 1.02 |
| $C_2Cl_4$ | 31 | 2.7 | ~57 | 1.11 |
| Ethanol-Water (40/60) wt. % | 30 | 5.6* | ~57 | |

*from Raoult's law $- \alpha \times P_{ethanol} + (1 - \alpha) \times P_{water}$ The propensity for cavitation in liquids and liquid systems is dependent on two parameters as shown in the following expression:

Cavitation propensity=Minimum (intermolecular bond strength, surface-liquid bond strength)

The surface-liquid interface bond strength refers to the bonding of liquid molecules to surfaces in contact with the liquid. This includes surfaces of container walls, particulate surfaces and dissolved gas. The surface-liquid interface bond strength=inter-molecular attraction+molecular mechanical interlocking+force to overcome $2\sigma/r_c$.

Intermolecular strength refers to interactions between the liquid molecules themselves. Intermolecular strength is equal to electron based attraction such as Van der Waal's forces and/or hydrophobic interaction. These parameters, while relatively smaller than the strength of ionic or covalent bonds, can be quite large for liquids such as water which can support a tensile pressure down to about −1,400 bar (or −20,000 psia) and generally range from −200 to −1400 bar. This is substantially below maximum tensile pressure states of around −10 bar in most practical engineering and technological applications. Nucleation theory-based estimates for the ultimate tensile strengths or $P_{neg}$, for various liquids (organic and inorganic) can be calculated from the following expression, $$\overline{P}_{neg} = -\frac{16\pi}{3}\left[\frac{\sigma^3}{kT\ \ln(NkT/h)}\right]^{1/2}$$

where, k and h are the Boltzman and Planck constants, $\sigma$ is the surface free energy. (i.e., surface tension), N is the number of activated atoms/molecules, and T is the liquid temperature. Because most liquids contain motes and/or microgas bubbles, methods for avoiding cavitation will depend on reducing cavity formation at interfaces between liquid and substrate surfaces and between liquid molecules and impurities. Table 2 presents results of evaluations of ultimate tensile strengths for various liquids based on the above formulation.

TABLE 2

Predicted/theoretical & measured negative pressure thresholds for various liquids (T = 300 K)

| | Maximum Tensil (Negative) Pressures (bar) | |
|---|---|---|
| Liquid | Theory (Eq. 4) | Measured |
| Water | −1,440 | −1,400 |
| Acetone | −243 | Not available |
| Chloroform | −321 | −317 |
| Benzene | −348 | −288 |

New methods for delaying or preventing cavitation in fluids are needed. They could be used to provide liquid environments that can withstand tension with minimal cavitation. They could be used in studies of fundamental fluid characteristics. To date, high tension levels in macroscale systems have been difficult to achieve due to cavitation. Cavitation resistant liquid could be used to generate tailored bubble cluster fields by triggering bubble nucleation with focused photon beams, such as laser beams, or with ionizing neutrons which could be used in chemical process systems as well as for enhancing mixing caused by bubbling in a space-time basis. Such methods would also be useful to prevent choking in jet fuel lines and could be used in conjunction with vessels, such as submarines, that employ propellers. Such methods would extend propeller life, increase acceleration and velocity characteristics, and reduce the acoustic signal of such vessels.

SUMMARY OF INVENTION

A method for generating cavitation resistance in a liquid, a portion of which can be in contact with a surface is disclosed. The disclosed method can be carried out by pressurizing the liquid, the liquid portion in contact with the surface, and/or the surface for a sufficient time to develop resistance to cavitation. The disclosed method can be carried out when the surface is made of a material having a surface roughness that is greater than the $r_c$ of the liquid. Suitable surfaces can be made from borosilicate glass, drawn glass, copper, lead, steel, cast iron, metal alloys and concrete. The surfaces can be ship and boat propeller surfaces, the interior fuel lines and fuel storage containers or any surfaces where cavitation can occur.

Suitable pressures are used so that, upon removal of the pressure, the treated liquids and liquid-surface regions resist cavitation when subjected to tension pressures of up to about −7 bar. For example, suitable pressures can range from about 10 bar to 2,000 bar depending upon the degree of cavitation resistance desired, the type of liquid used, and the strength of the system being pressurized. More typically, pressures of 30 to 70 bar can be used.

The pressure can be maintained on the liquid, the liquid in contact with the surface, and the surface for a suitable period of time to generate the desired resistance to cavitation—the time being tied to the duration of ingress of liquids into solid surface crevices for interlocking which is a process controlled via pressure gradients and acoustic relief times, and for microgas dissolution within molecules of the host fluid a diffusion rate limited process. Times of about 10-30 minutes to one, two, three or four hours or longer can be used and have proven effective, although shorter time spans may also be utilized. Shorter times may rely on diffusion and propagation time spans. The treated materials show the remarkable ability to resist cavitation for extended periods of time. For example, pressure treatment of dodecane in a borosilicate glass container resists cavitation for over 85 days when treated initially with 7 bar of over (precompression) pressure for 2 hours a single time followed with removal of the overpressure.

DETAILED DESCRIPTION OF INVENTION

Figure 1:
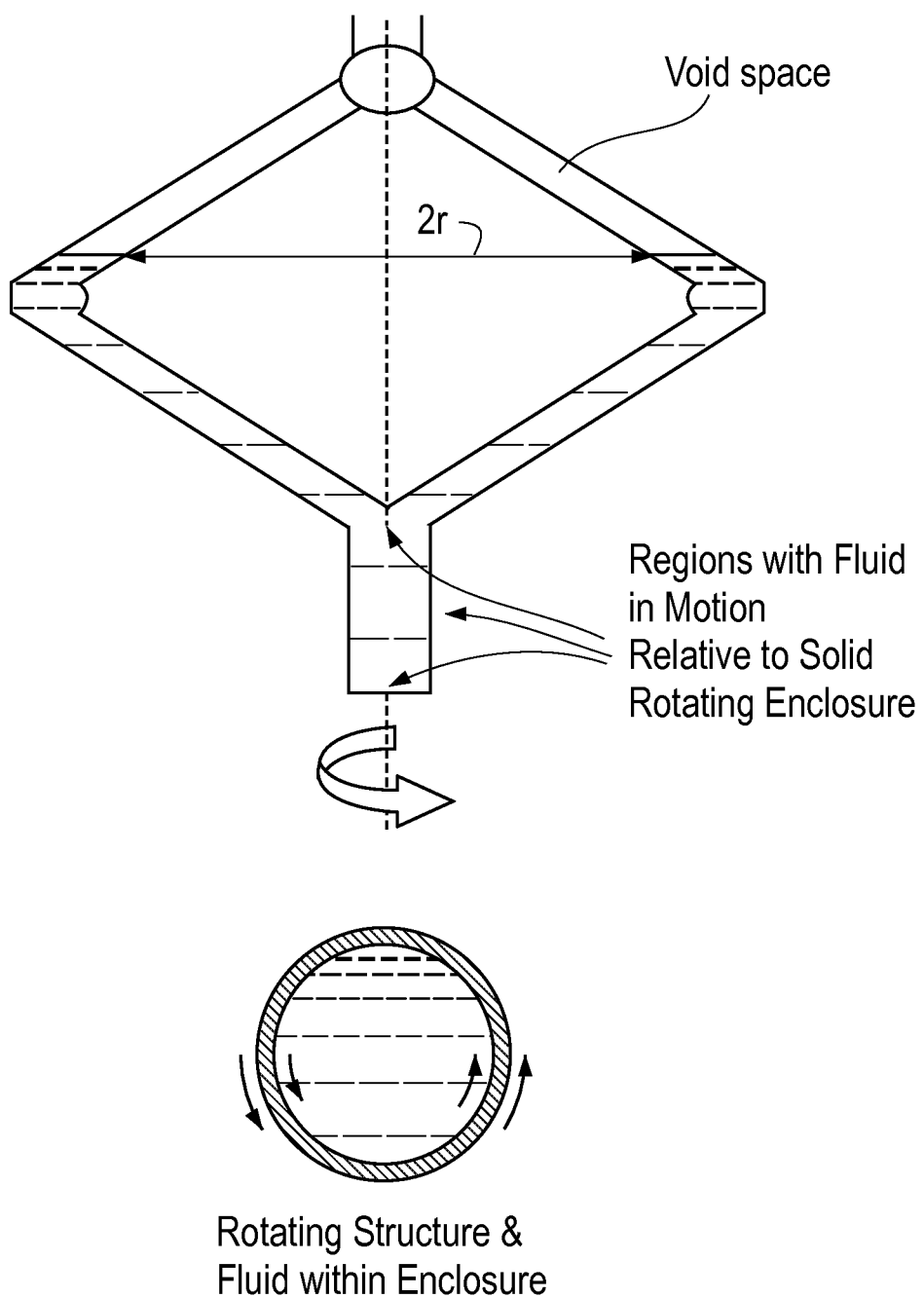
FIG. 1 provides cross sectional views of a centrifugally tensioned liquid spinner assembly which can be made of borosilicate glass. The upper figure shows a cross section of the entire spinner and the lower figure shows a cross section of the spinner base.

For purposes of this application the phrase "cavitation resistance" refers to minimizing bubble formation whether due to dissolved gas in a liquid or tension induced liquid vaporization events. A method for generating cavitation resistance in a liquid, a portion of which can be in contact with a surface is disclosed. The disclosed method can be carried out by pressurizing the liquid, the liquid portion in contact with the surface, and/or the surface for a sufficient time to develop resistance to cavitation. The disclosed method can be carried out when the surface is made of a material having a surface roughness that is greater than the $r_c$ of the liquid. Suitable surfaces can be made from borosilicate glass, quartz, drawn glass, copper, lead, steel, cast iron, metal alloys and concrete. The surfaces can be ship and boat boat propeller surfaces, the interior fuel lines and fuel storage containers or any surfaces where cavitation can occur.

Suitable pressures are used so that the liquids resist cavitation when subjected to tension pressures of about −7 bar. For example, suitable pressures can range from about 10 bar to 2,000 bar depending upon the degree of cavitation resistance desired and the strength of the system being pressurized. More typically, pressures of 30 to 70 bar can be used.

The pressure can be maintained on the liquid, the liquid in contact with the surface, and the surface for a suitable period of time to generate the desired resistance to cavitation. Times of about 10-30 minutes to one, two, three or four hours or longer can be used. The treated materials show the remarkable ability to resist cavitation for extended periods of time. For example, pressure treatment of dodecane in a borosilicate glass container resists cavitation for over 85 days when treated initially with 7 bar of pressure for 2 hours.

The organic liquids listed in Table 1 all have demonstrated cavitation resistance through −7 bar following a pressure treatment of about 100 psi (7 bar) and above. However, with water a pressure treatment of at least 25 bar was required to consistently avoid cavitation. This finding corresponds with the surface tension of water which is about three-fold higher than with the organic liquids in the table. The higher surface tension translates into a critical radius "$r_c$" for water that is about three-fold greater than for organic liquids. The approximate pressure treatment of a liquid "i" within an identical container ($P_{comp,i}$), in order to attain a similar level of cavitation resistance as for another liquid, such as dodecane is as follows:

$$P_{comp,i} \sim P_{comp,dodecane} \times \sigma_i / \sigma_{dodecane}.$$

This relationship also applies to liquid mixtures. Estimates for binary mixture surface tension for aqueous mixtures can be made according to known methods. See for example Perry's Chemical Engineers Handbook, 6th Ed. (page 3-288 to 3-289) which is incorporated herein by reference. This can be used in certain embodiments to avoid gas entrapment prior to pressure treatment.

Bonding of liquids at solid surface interfaces requires, in part, mechanical interlocking of the liquid field with the surface structure in question. If the roughness of a surface is smaller than the value for "$r_c$" liquid penetration into the crevices will not be possible. In this regard, we note that at least for a Δp=10 bar, for all the liquids the value of the computed "$r_c$" is significantly smaller (i.e., in the tens of nanometer range), than the (about 1 μm) surface roughness of the glass substrate utilized. Therefore, liquid penetration for improved mechanical wetting and interlocking occurs even when liquid-surface interfaces are treated with 10 bar of pressure.

Liquids with smaller $r_c$ values require stronger tensile liquid field pressure for cavitation. Since the surface tension and therefore the $r_c$ for water is three-fold higher than with other organic liquids where 7 bar of pressure was sufficient to provide cavitation resistance at about −7 bar for ethanol but for this same affect about 25 bar pressure treatment was required for water. Thus when $r_c$ is small enough, liquid-surface effects are such that cavitation is less likely because surfaces are more easily wetted. Table 3 presents surface roughness values (ε) for a variety of materials. (Source: Perry's Chemical Engineers' Handbook, 6th Ed.; Pg. 5-24; Table 5.6).

TABLE 3 surface roughness for various materials

| Material | Roughness (ε) - μM |
|---|---|
| Drawn glass, lead copper | <1 |
| Common steels | 46 |
| Cast iron | 260 |
| Concrete | 300 to 3,000 |

The values of $r_c$ in Table 1 are significantly lower than the surface roughness for drawn glass and are far lower than for the other surfaces. Therefore, the effects observed in the disclosed borosilicate glass spinners will be applicable with other materials such as drawn glass, copper, lead, steel, cast iron, metal alloys and concrete where the surface roughness is larger. This also applies to liquid contaminants wherein the surface roughness of the liquid contaminants, including motes, salts and microgas bubbles, combined with the liquid $r_c$ establishes the propensity for cavitation and the conditions necessary for creating cavitation resistance.

Cavitation resistance also affects critical heat flux which is a measure of boiling heat transfer from a heated surface. Critical heat flux is related to flooding caused by uncontrolled cavitation at a liquid surface which prevents entry of liquid on the heated surface. Hence, cavitation resistance impacts the level of heat flux that can be attained prior to flooding.

Figure 5A:
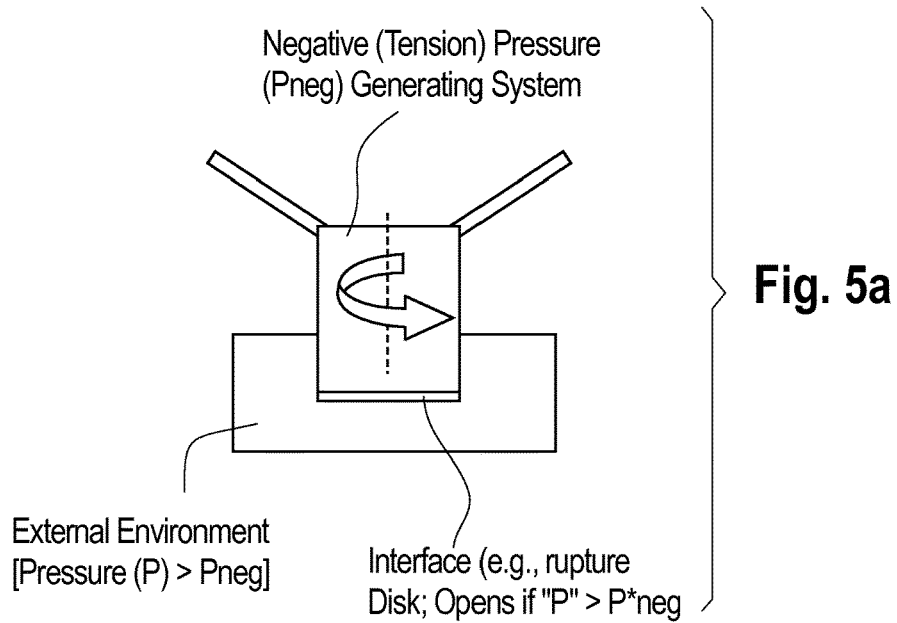
FIG. 5 demonstrates control of cavitation onset for desired $P_{neg}$ values prior to rapid opening and ingress of fluids. The figure shows an embodiment similar to that used in FIG. 1 to cause tension (negative) pressures ($P_{neg}$). At the base of the apparatus is a material surface (e.g., rupture disk) which can open up if a certain threshold pressure difference=P−P*$_{neg}$ is exceeded. Upon such opening, fluid and other media from the surrounding enclosure or environment are introduced into the base of the rotating structure.
Figure 5B:
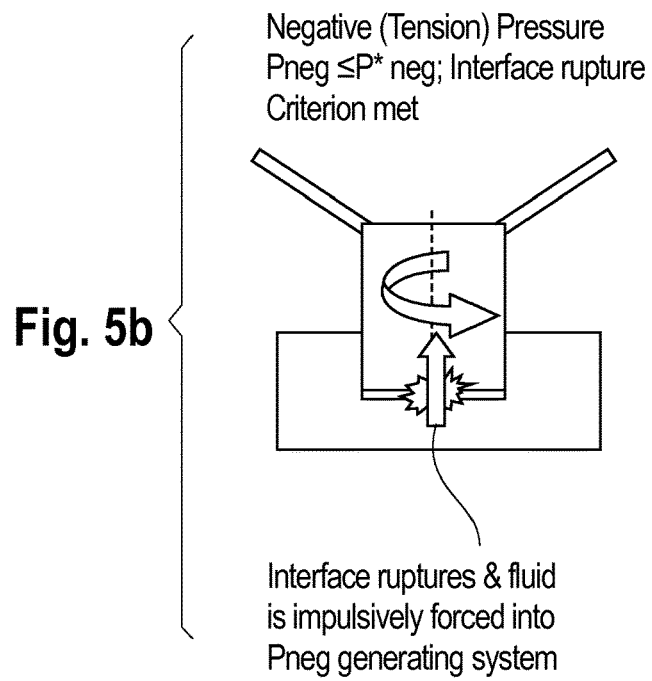

An embodiment is also disclosed for impulsive entrainment of fluids as shown in FIG. 5. FIG. 5 shows an embodiment that can control cavitation onset at desired $P_{neg}$ values prior to rapid opening and ingress of fluids. The embodiment can be used in a similar manner as the embodiment shown in FIG. 1 to generate negative pressures ($P_{neg}$). At the base of the apparatus is a material surface such as a rupture disk or similar solid structure such as glass, steel, copper, etc. or even semi-solids such as epoxies that have a terminal stress capability through a known $P^*_{neg}$ and that can open up if a certain threshold pressure difference=P−$P^*_{neg}$ is exceeded. Upon such opening, fluid and other media from the surrounding enclosure or environment are forcibly entrained (and lifted) in an impulsive manner into the base of the tensioned chamber. Such a device can find use in oil exploration and for general-purpose impulsive transport. The device can be pressure treated before or during use.

Methods for minimizing choking phenomena caused by cavitation in fluid lines are also disclosed. In this method $P_{neg}$ is the lowest negative pressure that a fluid in normal use would experience during operation of the flow line. Resistance to cavitation at about −7 bar has been obtained using pressure treatments of over 10 bar, under the following conditions:

Surfaces with roughness below 1 μm;
Liquids including water, ethanol, dodecane, $C_2Cl_4$, Freon-113 and acetone;
Relative speeds of flow of liquids over the surface of about 55 kph.

In theory the pressure reductions from a flow region "1" to the reduced flow area of a second region, "2," may be estimated using the Bernoulli principle and the equation of energy-continuity assuming an incompressible flow and no energy loss to or from the surroundings, as follows:

$$P_1 + pv_1^2/2 = P_2 + pv_2^2/2$$

$$pA_1v_1 = pA_2v_2$$

$P_1$, $P_2$, $v_1$, $v_2$, $A_1$, $A_2$ are fluid pressure, velocity and flow area in regions "1" and "2", respectively. For example, for the hypothetical case where the drive pressure head from a pump (region "1") is about 5 bar and results in a water flow velocity of about 5 m/s, the pressure in region "2" where the flow area is 10% of the nominal flow area in region "1" would amount to the flow velocity increasing to $v_2$=50 m/s in the contraction region "2" and a consequent pressure level of $P_2$=−7.38 bar. The required pressure treatment needed for treatment of the liquid filled enclosure to protect the enclosure from cavitation can then be determined such that cavitation would not occur at $P_2$.

For a flow line containing a liquid that is to be pumped, the following method can be used to prevent cavitation down to about −7 bar (the demonstrated value of $P_{neg}$ in laboratory experiments). If the flow line can withstand about a 30 bar pressure treatment, the entire liquid-filled enclosure can be subjected to pressure treatment. Preferably this can be started at the high pressure region near the outlet. Alternatively, at least those regions where the liquid pressure is expected to drop below 1 bar, for example in and around expansion or venturi regions, should be subjected to pressure treatment, such as for about 2 h, at a pressure of about 30 bar or more, if possible. The liquid to be pumped in addition to that located within the line and system, which was pressure treated, should separately be pressure treated to about 30 bar or more prior to release into the line. In every case the actual level of pressure treatment should be matched to the level of tension to be experienced by the liquid. To accomplish this the pressurization should be greater than $P_{neg} \times 3$ for water flow lines or $P_{neg}$ for organic fluid flow lines. Gas entrapment during this process should be avoided. This can be accomplished by preheating the pressurizing liquid or adding surfactants to liquids before they are pressure treated, for example.

In the case where a high surface tension liquid, such as water, is to be used in a transfer line, a special precaution must be taken to ensure the absence of gas/air pockets. For such situations, the enclosure and/or water should be heated to a temperature sufficient to avoid gas bubbles such as at about 80° C. during filling and prior to pressure treatment to bring down the surface tension to below about 60 mN/m. Alternate means for reducing the surface tension include the use of additives such as ethanol or surfactants, while avoiding foaming.

Figure 4:
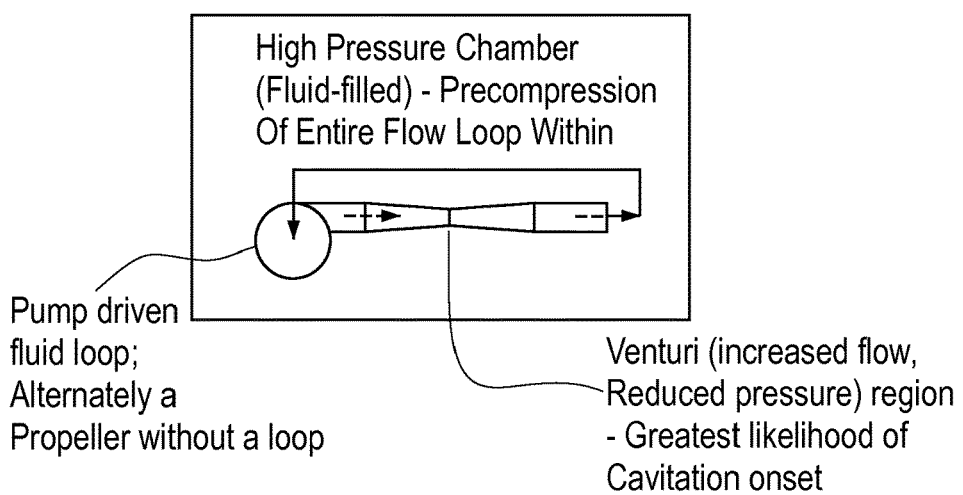
FIG. 4 depicts a venturi valve within a pressure jacket such that the valve can be treated to prevent cavitation.

If the liquid bearing line is not strong enough to support the required pressurization, the entire fluid-filled line can be placed within a fluid-filled enclosure jacket as shown in FIG. 4 and pressurization accomplished inside the jacket. In this manner the entire flow line can be pressure treated, such as for about 2 hours. Internal and external surfaces can be treated in this manner. With water flow lines the pressure treatment is generally greater than $P_{neg} \times 3$ and for organic fluid flow lines $P_{neg}$. Measures to avoid gas entrapment are also employed.

In a method flow line components can be separately treated using the above methods and then flow line assembled and used.

Alternatively, for situations involving the pumping of high surface tension liquids like water, the lines can be pressurized while filled with a liquid having a low surface tension. Liquids having surface tensions of below 30 mN/m are preferred. Such liquids include acetone, ethanol, Freon-113, methanol, and the like. This process is thought to function by filling up the pores of the surfaces during pressure treatment. Thereafter, the separately pressure treated higher surface tension liquid may be pumped through the line and cavitation resistance is maintained at liquid-structure interfaces and within the bulk liquid itself.

The following Examples describe experiments in which liquids, including water, ethanol and dodecane, were pressure treated for about 1-2 hours with about 8 bar and above of pressure and studied with respect to cavitation resistance over sustained periods of time at negative pressures of about −7 bar. Liquids in these experiments resisted cavitation under these conditions for several months. The experiments also demonstrate the relative involvement of liquid-surface interfaces and non-liquid-surface interfaces in cavitation.

EXAMPLE 1

This example demonstrates the influence of pressure treatment on the amount of tensile strength that the liquids distilled water, dodecane (95% pure, CAS 112-40-3 from Spectrum Chem. Mfg. Corp. and ethanol (denatured alcohol, Product #GSL26, W.M. Barr & Co., Inc.) can withstand without cavitation.

Liquid tensile strength was measured in a centrifugal tensioned metastable fluid chamber. FIG. 1 provides an illustration of the cross section of such a device. Shown is the chamber which includes a spinner with 30° curve and straight boundary interfaces between the liquid and solid glass structure. The spinner can be made of any material that can withstand the centrifugal forces applied to it. For example, in the present example the spinner was made from ultra-smooth borosilicate glass and in certain embodiments this glass can have imperfections of less than 1 μm surface roughness. Such a device was utilized to induce tension in about 5 mL of test liquid in order to measure the liquid's tensile strength. The test device has a central transparent bulb, such as a glass bulb, which can be filled with the test liquid. The liquid can be subject to tension pressure by spinning the device about its central axis. Vibration disturbances can accompany the spinner while spinning at high speeds with displacements of the central bulb of an estimated about 1-3 mm from the centerline while spinning at over 250 Hz (15,000 rpm). Nevertheless, this system can be used to place from 0 to at least about −7 bar (about −100 psia) of pressure in a test liquid or any intermediate pressure, as desired.

To enable relatively constant control conditions the glassware was thoroughly rinsed with acetone before inserting test liquids in the spinner apparatus. For example it can be rinsed twice with unfiltered acetone then twice with filtered acetone as was done in this example. Acetone can be filtered through 0.2 micron filters. The spinners are generally allowed to dry thoroughly prior to use. Test liquids were injected into the spinner using a standard syringe and without filtration or degassing. When water was tested it was heated to about 80° C. to lower its surface tension to avoid trapping air in various locations of the spinner. The warm water was injected into the unheated glass spinner after which the filled spinner was allowed to cool to room temperature. No such preheating was necessary for dodecane or ethanol. In control experiments spinners were filled with identical test liquids that were not pressure treated and tested in the same manner.

Figure 2:
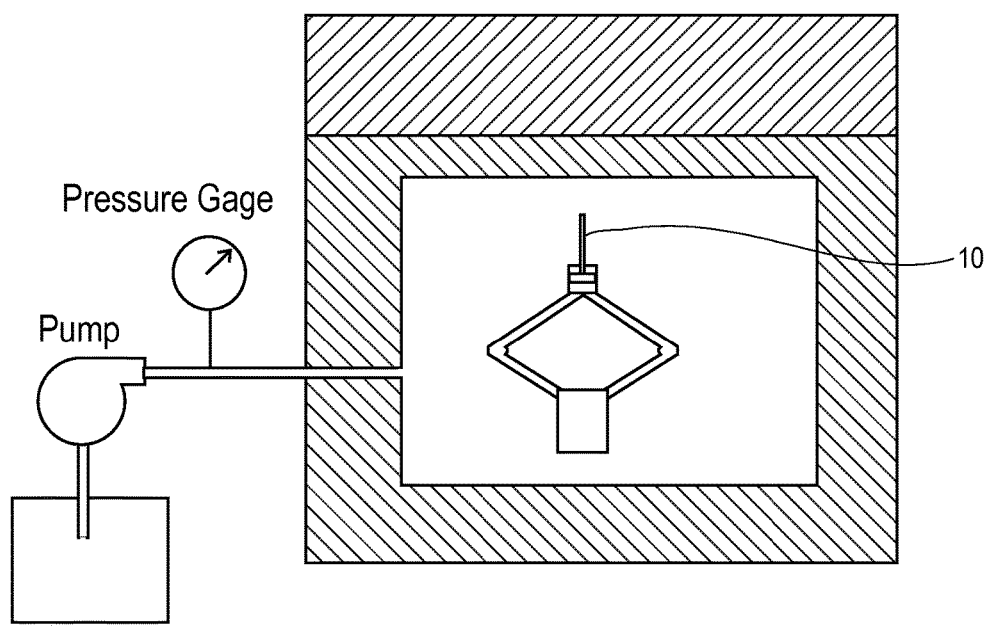
FIG. 2 depicts a system for pressure treating the spinner assembly when filled with a test liquid.

Once filled, the spinners were placed in an oil-filled cavity of a high pressure treatment chamber (HPTC) that is capable of introducing pressures of up to about 2,000 bar (30,000 psi). In order to equalize pressure of the fluid within the spinner with that of the HPTC without contaminating the liquid within the spinner from the oil of the HPTC, and yet subject the inside of the spinner to pressurize, the top of the glass spinner was closed off and connected to the HPTC volume using a piston 10 as shown in FIG. 2. The HPTC system was then pressurized to pressures ranging of about 70 bar (1,000 psig), 35 bar (500 psig), 10 bar (150 psig), and 8 bar (100 psig) for a period of about 2 hours. Any pressure can be used so long as the pressure does not break the apparatus during the pressure treatment. Following pressurization, the HPTC was depressurized and opened. The spinner with piston-assemblage can be removed from the HPTC; following this step, the piston-assemblage is removed, the spinner cleaned of oil from the outside; the liquid within the spinner partially drained so as to result in the configuration shown in FIG. 1, and the pressure treated liquid bearing spinner tested for resistance to cavitation, tensile strength. The time between the end of pressure treatment and testing of the spinner was usually about 20 minutes.

The tensile strength testing spinners were attached to a variable-speed drive motor controlled with programmable LABVIEW® engineering software running on a personal computer. The drive speed was programmed to increase at a linear rate, such that the system reached a tension pressure of up to about −7 bar in 10 seconds starting at 1 bar.

Cavitation was detected with a light beam through the central bubble and sensor which was configured to turn the motor off on bubble detection. Upon reaching about −7 bar if no cavitation was detected, the rotation speed was held at that level for up to 30 seconds and then stopped. The solutions were retested in the spinners for a total of 5 times each.

Both pressure treated liquids and untreated liquids were tested by attaching the spinner to a rotary drive motor and spinning the spinner at a frequency that creates negative test pressures of up to about −7 bar. Results of experimentation are summarized in Table 4. For control tests without pressure treatment all three liquids behaved erratically. In five trials cavitation took place between about 0.2 bar to about −1.5 bar. With dodecane the range varied between about 0 bar to −3 bar. The range varied from about −1.6 bar to −3.2 bar with ethanol. None of these solutions could reach about −7 bar without the occurrence of cavitation.

When dodecane and ethanol were pressurized at about 8 bar as described above they resisted cavitation at about −7 bar in five successive trials. With water pressurized at these pressures only 2 of 5 test samples resisted cavitation at about −7 bar. The results with ethanol and dodecane were repeated with ethylene chloride ($C_2Cl_4$), Freon-113 and acetone which all showed cavitation resistance after treatment at these pressures.

With pressure treatment at about 35 and 70 bar all three liquids resisted cavitation at about −7 bar in five successive trials. In one case when ethanol was treated at 35 bar the liquid resisted cavitation up to only about −5 bar. This was attributed to cosmic neutron induced cavitation which was verified using a Pu—Be isotope neutron source to show that the −5 bar tension level was sufficient to cause cavitation in ethanol with fast (MeV energy) neutrons.

With distilled water mixed with both sea salt and table salt at a concentration level of about 3.5 M with pressure treatment at about 70 bar for about 1-2 hours, the salt-water mixture could be taken down to −3 bar and −6 bar in five successive trials each lasting for about 30 seconds without cavitation. Without pressure treatment the salt-water mixture exhibited random cavitation onset at or around vacuum (~0 bar) pressure states.

The sustainability of cavitation resistance was also tested for a period of 85 days with dodecane. Dodecane was chosen for these studies because cavitation is not induced by neutrons at tension levels of about −7 bar (thus, enabling avoidance of cosmic neutron based cavitation) and because of its significance as a primary ingredient in jet fuel. For this study dodecane was pressurized to about 70 bar as described above. Identical control samples were also prepared that were not pressure treated.

In these studies the untreated controls lacked any discernible resistance to cavitation as shown in Table 4. As shown in Table 4, glass spinners containing pressure treated dodecane demonstrated cavitation resistance at about −7 bar on the day they were pressure treated. The test samples were periodically retested 12 times over the following 85 days. Cavitation resistance was retained throughout this testing period. The testing dates and results are shown in Table 4.

TABLE 4

Summary of results from long-term memory testing

| | Time (days) | Result |
|---|---|---|
| Control tests, no pressure | 1 | Spurious cavitation above −7 bar |
| about 70 bar pressure | 1 | No cavitation to about −7 bar |
| about 70 bar pressure | 8 | No cavitation to about −7 bar |

TABLE 4-continued

Summary of results from long-term memory testing

| | Time (days) | Result |
|---|---|---|
| about 70 bar pressure | 15 | No cavitation to about −7 bar |
| about 70 bar pressure | 22 | No cavitation to about −7 bar |
| about 70 bar pressure | 29 | No cavitation to about −7 bar |
| about 70 bar pressure | 30 | No cavitation to about −7 bar |
| about 70 bar pressure | 31 | No cavitation to about −7 bar |
| about 70 bar pressure | 32 | No cavitation to about −7 bar |
| about 70 bar pressure | 33 | No cavitation to about −7 bar |
| about 70 bar pressure | 62 | No cavitation to about −7 bar |
| about 70 bar pressure | 65 | No cavitation to about −7 bar |
| about 70 bar pressure | 85 | No cavitation to about −7 bar |

The relative importance of the retention of cavitation resistance at liquid-wall interfaces versus non liquid-wall interfaces in the body of the liquid was also evaluated. Table 5 shows results from these experiments. For organic liquids such as dodecane and ethanol, retention of cavitation resistance was found to depend primarily on bonding at liquid-surface interfaces. With these liquids, cavitation resistance at about −7 bar of pressure was retained even after pressure treatment of the liquid-filled spinner was followed by removal of the pressure treated liquid and replacement with an otherwise identical but untreated liquid. On the other hand, substitution of untreated water for the pressure treated water in a pressure treated spinner resulted in complete loss of cavitation resistance. Thus, for water the retention of cavitation resistance at about −7 bar depended on simultaneous retention of cavitation bonding strength at liquid-surface interfaces and also within the bulk of the fluid at non-liquid-surface interfaces. Pressure treated dodecane, water, or ethanol all failed to show any cavitation resistance when added to spinners that had not previously been filled with the respective liquids and pressure treated.

TABLE 5

Surface-liquid and bulk-liquid cavitation

| | Results of testing | | |
|---|---|---|---|
| System State | Dodecane | Ethanol | Water |
| Control case | Spurious cavitation above −7 bar | Spurious cavitation above −7 bar | Spurious cavitation above −7 bar |
| about 70 bar pressure and testing | No cavitation to about −7 bar | No cavitation to about −7 bar | No cavitation to about −7 bar |
| about 70 bar pressure, pressure treated liquid replaced with untreated liquid and testing | No cavitation to about −7 bar | No cavitation to about −7 bar | Spurious cavitation above −7 bar |
| Liquid pressurized to about 70 bar, placed in untreated spinner and tested | Spurious cavitation above −7 bar | Spurious cavitation above −7 bar | Spurious cavitation above −7 bar |

This example has demonstrated that modest pressure treatment for about 1-2 hours can cause the treated liquids to resist cavitation for water and organic liquids such as dodecane and ethanol. With pressure treatment at about 8 bar (100 psia) both dodecane and ethanol liquids could resist cavitation up to at least about −7 bar (−100 psia). Water had improved cavitation resistance at about −7 bar after pressure treatment at about 10 bar and was completely resistant to cavitation after exposure to pressures of 35 and 60 bar. It is also apparent that resistance to cavitation is retained in pressure treated liquids for extended periods of time. Dodecane retained its resistance to cavitation for 85 days after pressure treatment at about 70 bar. Lastly, this example demonstrates that the resistance to cavitation with organic liquids such as ethanol and dodecane primarily arises from pressure treatment of liquid-surface interfaces whereas with water cavitation resistance arises from pressure treating the bulk fluid (liquid-liquid-mote-micro gas bubble bonding strength) as well as water-surface interfaces.

EXAMPLE 2

Figure 3:
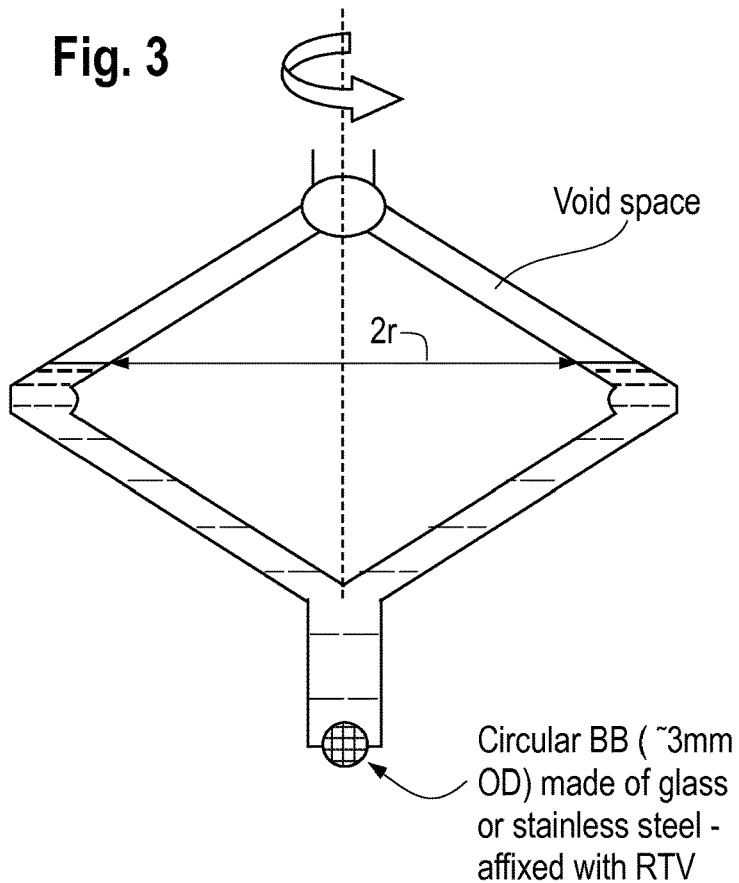
FIG. 3 depicts a design for a centrifugally tensioned liquid spinner made of glass in which the base of the central bulb is affixed to a spherically shaped object.

This example demonstrates that pressure treatment reduces cavitation on stainless steel, glass and epoxy surfaces. As shown in FIG. 3 a hole was drilled at the base of the central glass bulb of a device such as in FIG. 1 and a stainless steel spherical object was affixed to the hole. Using RTV cement a glass bead and an epoxy bead were also attached in separate experiments. In this embodiment the liquid within the spinner assembly contacts both the glass walls of the spinner, and the surface of the object and the surrounding RTV cement. The devices were tested using the same protocol as in Example 1 and gave the same results with regard to cavitation as obtained in Example 1. The result confirmed that precompression prevents cavitation at the tension levels used in Example 1, even when the contact surface is metal, glass of a different type, as well as epoxy (RTV). Testing was done with dodecane, acetone and water.

EXAMPLE 3

This example demonstrates methods for generating cavitation resistance in rotating systems such as on propeller surfaces.

At water depths where the ambient pressure is over 20 bar, cavitation can be controlled by treatment of solid surface water interfaces on propeller blades.

The testing spinner of FIG. 1 provides an example of cavitation resistance of liquids moving against solid surfaces under vacuum conditions. The relative speed of liquid next to the solid surface of the glass spinners in the CTMFD testing device rises to 55 kph when the device is spinning and creating approximately about −7 bar tension, when the liquid is standing still at the surface with the surface moving. Hence, cavitation resistance for liquid pressures down towards −7 bar at solid-liquid interfaces up through 55 kph can be attained using pressure treatments of about 30 bar and above. This also assumes, as would normally be the case, that the propeller material surface roughness is greater than that of ultra smooth borosilicate glass (i.e., above 1 μm).

To prevent or control cavitation over propeller blades, the steps to be taken include pressure-treating the propeller (especially the tip regions where $P_{neg}$ will be greatest or where velocities reach highest values) in water or other organic liquids to fill up pores prior to allowing rewetting in bulk fluid. When the liquid environment is to be water, a further step should be taken to reduce surface tension of water to below 60 mN/m prior to pressure treatment (using either thermal heating of water, use of surfactant or the adding of a lower surface tension liquid like ethanol). After pressure treatment, the propeller surfaces are retained in the liquid environment until placement into the bulk liquid.

The invention claimed is:

1. A method for generating cavitation resistance in a liquid with a surface tension higher than 60 mN/m, a portion of which is in contact with a surface within a vessel, comprising
   lowering the surface tension by one or both of (i) adding a fluid having a lower surface tension than the liquid to the liquid, and (ii) heating the liquid;
   pressure treating the liquid by pressurizing the liquid and the liquid surface interface for a predetermined amount of time and a predetermined amount of pressure, followed by releasing the pressure to generate resistance to cavitation when the liquid is subject to a tension that gives rise to cavitation, and
   equalizing pressure outside the vessel with the pressure inside the vessel if necessary to prevent vessel wall rupture;
   wherein the liquid and the liquid surface interface generate fewer cavitation events than for a liquid and liquid surface interface that has not been treated with said pressure treatment.

2. The method of claim 1 wherein the vessel is made of material selected from the group of homogeneous materials consisting of borosilicate glass, drawn glass, copper, lead, steel, cast iron, metal alloy and heterogeneous materials consisting of concrete, metal-glass composites and semi-solid epoxies.

3. The method of claim 1, wherein the surface is a portion of a propeller.

4. The method of claim 1, wherein the surface is a portion of a fuel flow line.

5. The method of claim 1 wherein the liquid is a mixture.

6. The method of claim 1 wherein the liquid comprises an organic component.

7. The method of claim 1 wherein the liquid comprises an inorganic component.

8. The method of claim 1 wherein the liquid comprises a mixture of water and salt.

9. The method of claim 1 wherein the liquid comprises a mixture of inorganic and organic components.

10. The method of claim 1 wherein the liquid comprises a mixture includes inorganic and organic particulates.

11. The method of claim 1 wherein the predetermined pressure is 10 bar or more to 2,000 bar.

12. The method of claim 1 wherein the predetermined pressure is 10 bar or more.

13. The method of claim 1 wherein the pressure is maintained for the predetermined amount of time of at least 10 minutes.

14. The method of claim 1 wherein the system is an impulsive suction generator for entrainment of materials.

15. The method of claim 1, wherein fluid is selected from the group consisting of Acetone, ethanol, dodecane, tetrachloroethylene ($C_2Cl_4$), and ethanol-water (40-60% by weight).

16. The method of claim 1, wherein the lowering the surface tension step by heating includes heating the liquid to 80° C. when the liquid is water.

* * * * *